(12) United States Patent
Turner (10) Patent No.: US 6,803,938 B2
(45) Date of Patent: Oct. 12, 2004

(54) DYNAMIC LASER PRINTER SCANNING ALIGNMENT USING A TORSIONAL HINGE MIRROR

(75) Inventor: Arthur Monroe Turner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 107 days.

(21) Appl. No.: 10/335,780

(22) Filed: Jan. 2, 2003

(65) Prior Publication Data

US 2003/0210323 A1 Nov. 13, 2003

Related U.S. Application Data

(60) Provisional application No. 60/378,309, filed on May 7, 2002.

(51) Int. Cl.$^7$ ............................................. B41J 2/475
(52) U.S. Cl. ........................................ 347/237; 347/247
(58) Field of Search .............................. 347/237, 247

(56) References Cited

U.S. PATENT DOCUMENTS

| | | | | |
|---|---|---|---|---|
| 4,317,611 A | * | 3/1982 | Petersen | ..................... 359/214 |
| 4,762,994 A | * | 8/1988 | Byerly et al. | ................ 250/236 |
| 5,543,956 A | * | 8/1996 | Nakagawa et al. | ......... 359/225 |
| 5,606,447 A | * | 2/1997 | Asada et al. | ................. 359/199 |
| 5,629,790 A | * | 5/1997 | Neukermans et al. | ....... 359/198 |
| 5,767,666 A | * | 6/1998 | Asada et al. | .................. 324/97 |
| 5,959,760 A | * | 9/1999 | Yamada et al. | ............. 359/224 |
| 6,069,727 A | * | 5/2000 | Cho et al. | .................... 359/226 |
| 6,295,154 B1 | * | 9/2001 | Laor et al. | ................... 359/223 |

* cited by examiner

Primary Examiner—Huan Tran
(74) Attorney, Agent, or Firm—William B. Kempler; W. James Brady, III; Frederick J. Telecky, Jr.

(57) ABSTRACT

In a laser printer which uses a scanning mirror 12 with torsional hinges 36A, 36B driven by electrical coils 30A, 30B to provide resonant pivoting, at least one sensor 84, 88 is located proximate each end of a resonant sweep or scan. Pulses or signals from the sensor indicating the passing of a sweeping or scanning light beam are connected to computational circuitry 92 in a feedback loop. This information is used to determine the center of the beam sweep. The center of the beam sweep is then aligned with the center of the photosensitive medium, such as a rotating drum 44, by adjusting the DC current provided to the drive coils.

24 Claims, 6 Drawing Sheets

DYNAMIC LASER PRINTER SCANNING ALIGNMENT USING A TORSIONAL HINGE MIRROR

This application claims the benefit of U.S. Provisional Application No. 60/378,309, filed on May 7, 2002, entitled Printer Scanning Alignment Using a 3D Resonant Scanning Mirror, which application is hereby incorporated herein by reference.

TECHNICAL FIELD

The present invention relates generally to "laser printers" and more specifically to apparatus and circuitry for dynamically aligning the laser beam of printers which use MEMS (micro-electric mechanical systems) type mirrors (such as dual axis torsional hinge mirrors) to provide bi-directional raster type scanning across a moving photosensitive medium, such as a drum. A first set of torsional hinges is used for providing the raster scan of a controlled resonant frequency about a first axis.

Alignment of the printer scan can be continuously monitored and dynamic adjustments made during printer operation by adjusting the DC current of its drive coils to position the center of the laser sweep on the photosensitive medium.

BACKGROUND

Rotating polygon scanning mirrors are typically used in laser printers to provide a "raster" scan of the image of a laser light source across a moving photosensitive medium, such as a rotating drum. Such a system requires that the rotation of the photosensitive drum and the rotating polygon mirror be synchronized so that the beam of light (laser beam) sweeps or scans across the rotating drum in one direction as a facet of the polygon mirror rotates past the laser beam. The next facet of the rotating polygon mirror generates a similar scan or sweep which also traverses the rotating photosensitive drum but provides an image line that is spaced or displaced from the previous printed image line. Alignment of the optical components comprising this type of printer is accomplished during the manufacturing process. Any subsequent realignment requires slow and difficult positioning and securing in place the various optical components. Thus, there is no alignment or realignment available for temporary misalignment such as might occur as a result of temperature changes.

Prior art efforts to use a single and typically much less expensive flat mirror with a single reflective surface, such as a resonant mirror, to provide a scanning beam unfortunately require significant compromise in performance. For example, the rotating photosensitive drum and the scanning mirror generating the beam sweep or scan can be synchronized as the "resonant" mirror first pivots or rotates in one direction such that a first printed image line on the medium is at right angles or orthogonal with the movement of the photosensitive medium. Unfortunately, however, the return sweep will traverse a trajectory on the moving photosensitive drum which will be at an unacceptable angle with the first printed image line resulting from the previous sweep. Consequently, if such a single reflecting surface resonant mirror is to be used, it is necessary to interrupt the modulation of the reflected light beam and wait for the mirror to complete the return sweep or cycle, and then again start scanning in the original direction. This requirement of only using one of the sweep directions of the mirror, of course, reduces the print speed and requires expensive and sophisticated synchronization between the mirror and the rotating drum.

Texas Instruments presently manufactures a two-axis analog mirror MEMS device fabricated out of a single piece of material (such as silicon, for example) typically having a thickness of about 100–115 microns. The layout consists of a mirror normally having a size of about 3.8 millimeters by 3.2 millimeters supported on a gimbal frame by two silicon torsional hinges. The mirror may be of any desired shape, although an oval shape is often preferable. As an example, an elongated oval shaped mirror having a long axis of about 5.5 millimeters and a short axis of about 1.2 millimeters has been found to be especially suitable. The gimbal frame is attached to a support frame by another set of torsional hinges. A similar single axis mirror device may be fabricated by eliminating the gimbal frame and hinging the mirror directly to the support frame. A first pair of drive coils controls the movement of the mirror about one of the two axes and a second pair of drive coils controls the movement of the mirror about the second axis. This Texas Instruments manufactured mirror is particularly suitable for use with a laser printer by using one set of coils to generate a resonant sweep of the mirror at a selected frequency. The other set of coils provides slight movement to assure printed image lines are at right angles to the printed page.

However, as was true with rotating polygon mirror laser printers, alignment of the optical components is very important if quality printing is to be achieved.

Therefore, there would be a significant advantage and improvement to laser printers if the optical alignment of the components could be continuously monitored and dynamically adjusted when misalignment occurs for substantially any reason including temperature variations, shock, vibration or even component work.

SUMMARY OF THE INVENTION

The problems mentioned above are addressed by the present invention which, according to one embodiment, provides a scanning mirror apparatus suitable for use as the means of generating a sweeping or scanning beam of light across a moving photosensitive medium, such as a rotating drum, in a laser printer. The mirror apparatus comprises a mirror device including a reflective surface portion positioned to intercept the beam of light from a light source. The reflective surface of the mirror device is supported by a first hinge arrangement, such as torsional hinges, for pivoting around a first axis and is further supported by a second hinge arrangement for pivoting about a second axis substantially orthogonal to the first axis. Thus, pivoting of the mirror device about the first axis results in a beam of light reflected from the reflective surface sweeping along a first plane and pivoting of the device about the second axis results in the reflective light beam moving in a direction which is substantially orthogonal to the first plane. The mirror apparatus also includes a first driver for alternately causing pivoting in one direction about the first axis and then the opposite direction to provide a beam sweep or scanning across a moving photosensitive medium. The moving photosensitive medium is located to receive a modulated image of the reflected light beam as it sweeps a trace across the drum or moving medium between a first edge and a second edge in one direction across the medium as the mirror device pivots about the first axis. The photosensitive medium rotates or moves in a direction such that sequential images or traces are spaced from each other. Therefore, to avoid the image line being printed at an angle on the page, there is also included a second driver for pivoting the mirror about the second axis such that an image line of the sweeping beam received on the photosensitive medium or drum is maintained substantially orthogonal to the movement of the photosensitive medium. A pair of light sensors are located to intercept the sweeping light beam at the beginning and end of both the forward and the reverse sweeps of a sweep cycle. Computational circuitry receives the signals from the light sensors. The signals are then used to determine the center of the beam sweep. The center of the sweep is then aligned or adjusted with respect to the photosensitive medium by changing the DC bias level applied to the first drive coil.

BRIEF DESCRIPTION OF THE DRAWINGS

Other objects and advantages of the invention will become apparent upon reading the following detailed description and upon referencing the accompanying drawings in which.

DETAILED DESCRIPTION OF ILLUSTRATIVE EMBODIMENTS

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to laser printers using mirror apparatus with a moveable reflecting surface that has torsional hinges, and is particularly suitable for use to provide the raster scans of a laser beam type printer by using either a single two-axis resonant mirror according to one embodiment, or using one single axis resonant mirror in combination with another mirror device, such as a polygon mirror, or a second single axis mirror for providing parallel lines of print by continuously adjusting the vertical movement of the beam with respect to the movement of the photosensitive medium.

Figure 1:
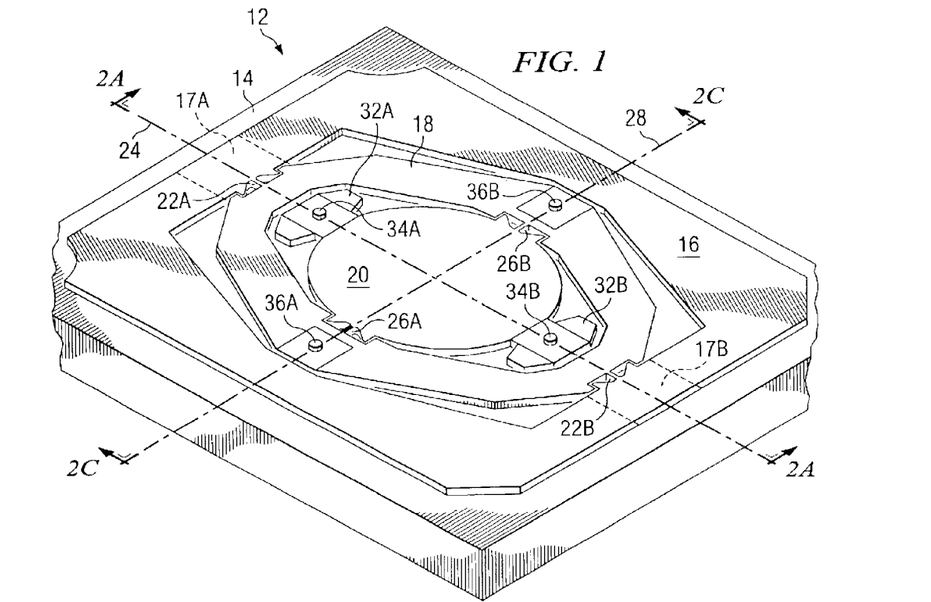
FIG. 1 is a perspective view of a two-axis torsional hinge mirror for generating the bi-directional beam sweep according to the teachings of one embodiment of the present invention.

Referring now to FIG. 1, there is shown a perspective view of a two-axis bi-directional mirror assembly 12 which can be used to provide a bi-directional beam sweep across a photosensitive medium and wherein the beam sweep is adjusted in a direction orthogonal to the oscillations of the mirror to maintain parallel printed image lines produced by a beam sweep in one direction and then in a reverse direction. As shown, moveable mirror assembly 12 is illustrated as being mounted on a support structure 14. The mirror assembly 12 may be formed from a single piece of substantially planar material and the functional or moving parts may be etched in the planar sheet of material (such as silicon) by techniques similar to those used in semiconductor art. As discussed below, the functional components include a support portion such as, for example, the frame portion 16, an intermediate gimbals portion 18 and an inner mirror portion 20. It will be appreciated that the intermediate gimbals portion 18 is hinged to the frame portion 16 at two ends by a first pair of torsional hinges 22A and 22B spaced apart and aligned along a first axis 24. Except for the first pair of hinges 22A and 22B, the intermediate gimbals portion 18 is separated from the frame portion 16. It should also be appreciated that, although frame portion 44 provides an excellent support for mounting the device to support structure 42, it may be desirable to eliminate the frame portion 44 and simply extend the torsional hinges 22A and 22B and anchor the hinges directly to support structure 42, as indicated by anchors 17A and 17B shown in dotted lines in FIG. 1.

The inner, centrally disposed mirror portion 20, having a reflective surface centrally located thereon, is attached to gimbals portion 18 at hinges 26A and 26B along a second axis 28 that is orthogonal to or rotated 90° from the first axis. The reflective surface on mirror portion 20 is on the order of 100–115 microns in thickness and is suitably polished on its upper surface to provide a specular or mirror surface. In order to provide necessary flatness, the mirror is formed with a radius of curvature greater than approximately 2 meters with increasing optical path lengths requiring increasing radius of curvature. The radius of curvature can be controlled by known stress control techniques such as by polishing on both opposite faces and deposition techniques for stress controlled thin films. If desired, a coating of suitable material can be placed on the mirror portion to enhance its reflectivity for specific radiation wavelengths. Further, although an oval-shaped mirror has been found to be particularly suitable, it will be appreciated that the mirror could have other shapes such as, for example, round, square, rectangular or some other polygon shape.

Figure 1A:
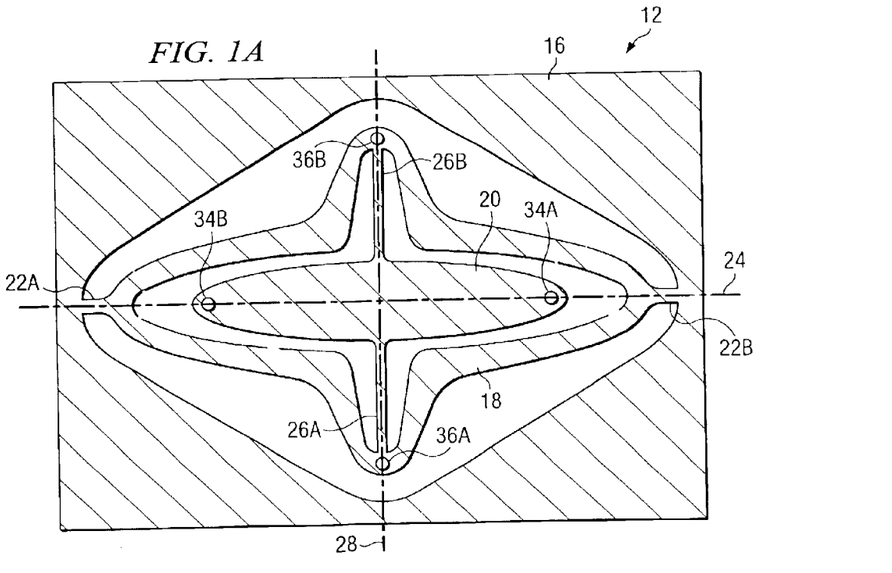
FIG. 1A is a perspective view of an alternate embodiment of a two-axis torsional hinge mirror.

FIG. 1A illustrates another embodiment of a dual-axis mirror suitable for use with the present invention. Instead of a round reflective surface 20, the embodiment of FIG. 1A has a long oval shape. Functional components of the two embodiments carry the same reference numbers.

Referring now to FIGS. 2A, 2B, 2C and 2D along with FIG. 1, mirror assembly 12 will typically include a first driver, such as for example, a pair of serially connected electrical coils 30A and 30B under tabs 32A and 32B respectively. Thus by energizing coils 30A and 30B with alternating positive and negative square wave pulses of a selected frequency, the mirror portion 20 can be made to oscillate at a desired frequency. Further, by carefully controlling the dimensions of hinges 26A and 26B (i.e., width, length and thickness), the natural resonant frequency of the mirror as it pivots back and forth on hinges 26A and 26B can be designed to be substantially the same as the desired oscillating frequency of the mirror. Thus, by providing a mirror with a resonant frequency substantially equal to the desired oscillating frequency, the power requirements may be reduced. By mounting gimbals portion 18 to frame portion 16 by means of hinges 22A and 22B, motion of the gimbals portion 18 about the first axis 24 is provided by another pair of serially connected coils 38A and 38B. As will be discussed, pivoting about axis 24 will provide the vertical motion necessary to maintain consecutive printed image lines parallel to each other. Similarly, by mounting mirror portion 20 to gimbals portion 18 via hinges 26A and 26B, resonant oscillating motion of the mirror portion relative to the gimbals portion is obtained about the second axis 28.

If electromagnetic coils 30A and 30B are used as the first driver, the mirror assembly 12 may also include a first pair of permanent magnets 34A and 34B mounted on tabs 32A and 32B of mirror portion 20 along the first axis 24. Likewise, if electromagnetic coils are also used to provide motion orthogonal to the beam sweep, a second pair of permanent magnets 36A and 36B may be included on gimbals portion 18 along the second axis 28. In order to symmetrically distribute mass about the two axes of rotation to thereby minimize oscillation under shock and vibration, each permanent magnet 34A, 34B, 36A and 36B preferably comprises an upper magnet set mounted on the top surface of the mirror assembly 12 using conventional attachment techniques such as indium bonding, and an aligned lower magnet similarly attached to the lower surface of the mirror assembly as shown in FIGS. 2A–2D. The magnets of each set are arranged serially such as the north/south pole arrangement indicated in FIG. 2C. There are several possible arrangements of the four sets of magnets which may be used, such as all like poles up; or two sets of like poles up, two sets of like poles down; or three sets of like poles up, one set of like poles down, depending upon magnetic characteristics desired.

Figure 2A:
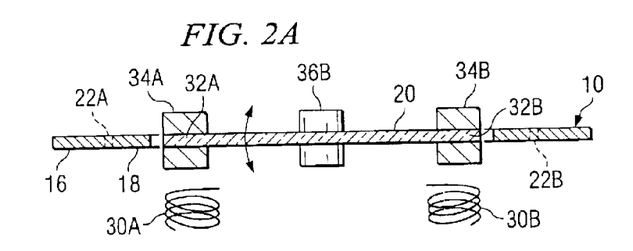
FIGS. 2A–2D are cross-sectional views of FIG. 1 illustrating rotation or pivoting of the two sets of torsional hinges.
Figure 2B:
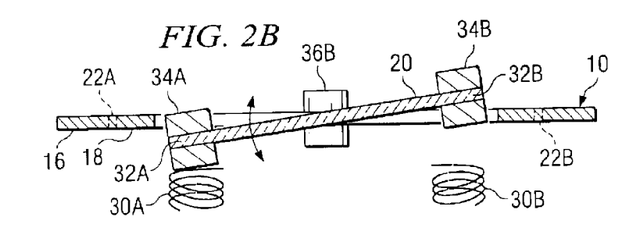
Figure 2C:
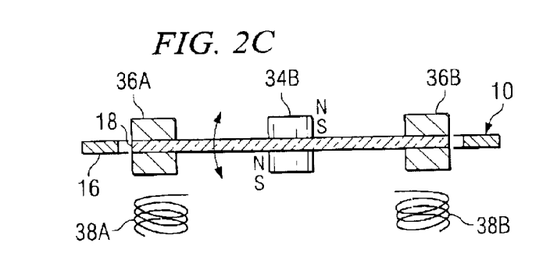
Figure 2D:
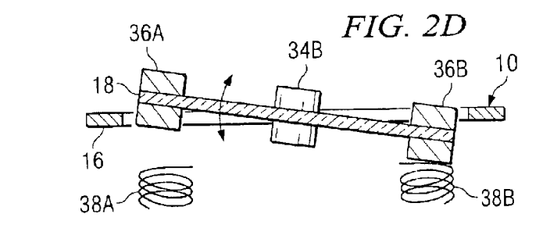

The middle or neutral position of mirror assembly 12 is shown in FIG. 2A, which is a section taken through the assembly along line 1A—1A (or axis 24) of FIG. 1. Rotation of mirror portion 20 about axis 28 independent of gimbals portion 18 and/or frame portion 16 is shown in FIG. 2B as indicated by the arrow. FIG. 2C shows the middle position of the mirror assembly 12, similar to that shown in FIG. 2A, but taken along line 1C—1C (or axis 28) of FIG. 2. Rotation of the gimbals portion 18 (which supports mirror portion 20) about axis 24 independent of frame portion 16 is shown in FIG. 2D as indicated by the arrow. The above arrangement allows independent rotation of mirror portion 20 about the two axes which in turn provides the ability to direct the beam sweep toward a moving photosensitive medium and still produce parallel lines.

It should also be appreciated that drive circuits other than electromagnetic may be employed for causing pivoting of the mirror device around the torsional hinges. Other suitable drive circuits include piezoelectric drivers and electrostatic drive circuits. Piezoelectric and electrostatic drive circuits have been found to be especially suitable for generating the resonant oscillation for producing the back and forth beam sweep.

Figure 3A:
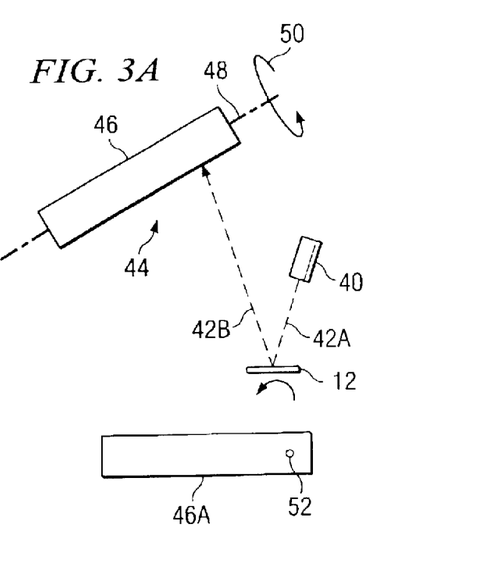
FIGS. 3A, 3B, and 3C illustrate the use of one two-axis resonant mirror of FIG. 1 to generate a bi-directional beam sweep of a laser printer.
Figure 3B:
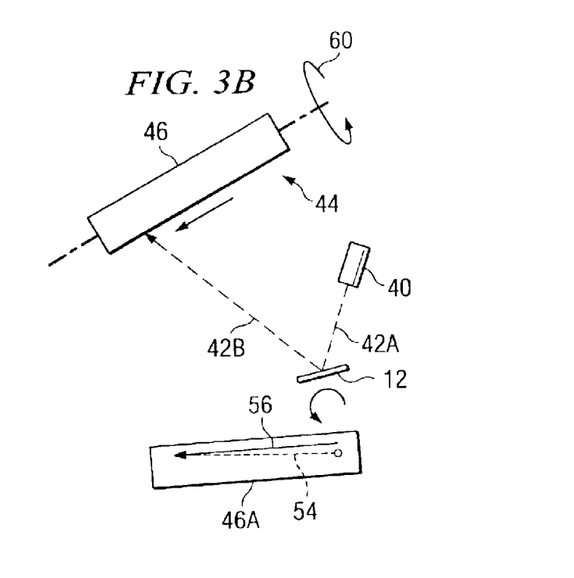
Figure 3C:
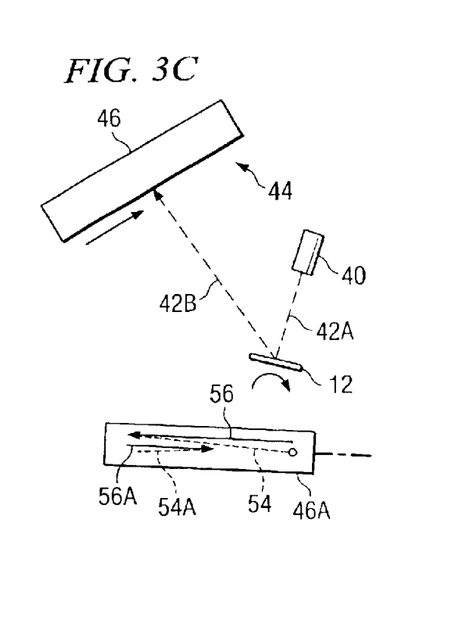

FIGS. 3A, 3B and 3C illustrate the use of a dual orthogonal scanning resonant mirror 12 such as shown in FIG. 1 according to one embodiment of the present invention. As shown, light source 40 produces a beam of light, such as a laser beam, that is focused on the resonant scanning mirror 12 so that the beam of light from the light source 40 is intercepted by the oscillating or resonant scanning mirror 12. Thus the laser beam of light 42A from the light source 40 is reflected from sweeping or resonant mirror 12, as illustrated by dashed line 42B, to a moving photosensitive medium 44, such as a rotating photosensitive drum 46, having an axis of rotation 48. The moving photosensitive medium 44 or drum 46 rotates around axis 48 in a direction as indicated by the accurate arrow 50 such that the area of the moving photosensitive medium 44 or drum 46 exposed to the light beam 42B is continuously changing.

Initial point 52 in FIG. 3A illustrates the beginning of a beam sweep by the dual axis resonant mirror 12, and FIG. 3B illustrates the beam sweep 56 as mirror 12 substantially completes its scan. As illustrated by the FIGS. 3A and 3B, as viewed looking toward the photosensitive drum 46A and as will be discussed below, vertical movement of the beam sweep 42B is synchronized with the movement of the rotating drum 46, 46A so that the distance the medium 44 or rotating drum 46 moves is equal to the vertical distance the light beam 42B moves during a sweep. Thus, the vertical movement of the beam trajectory as illustrated by reference number 54 results in a horizontal image line 56 on the moving photosensitive medium 44 or drum 46. More specifically, as can be seen from FIGS. 3A and 3B, the operation of dual orthogonal scanning mirror assembly 12 as it scans from right to left in the FIGS. is the same as a single axis mirror as will be discussed below. However, unlike a single axis mirror, it is not necessary to turn off and stop the modulation of the laser (light beam 42B) on the return scan, since a "return" or left to right scan as shown in FIG. 3C can also be active. That is, the light beam may be continuously modulated during the return scan, so as to produce a printed line of images on the moving photosensitive medium 44 in both directions. The second printed line of images 56A generated by the left to right scan 54A, according to the present invention, will be parallel to the previous right to left scan 56. This is accomplished by pivoting of the mirror around the secondary axis of the dual axis mirror in the manner discussed above.

Figure 4:
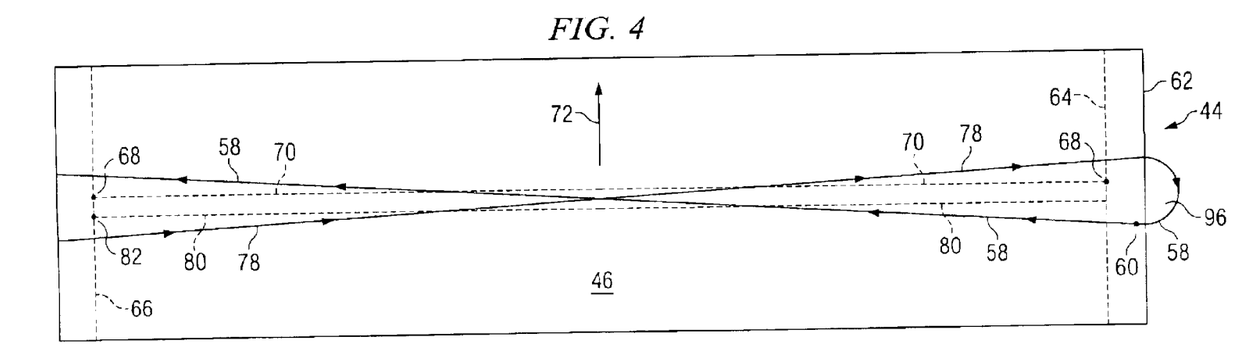
FIG. 4 illustrates a beam sweep generated by the apparatus of FIGS. 3A, 3B, and 3C.

Referring now to FIG. 4, there is shown an exaggerated schematic of the laser beam trajectory responsive to mirror movement about two axes during a complete resonant cycle. The beam trajectory illustrated in FIG. 4 is shown with a portion of a moving photosensitive medium 44 to illustrate how the beam trajectory generates two parallel image lines during the right to left scan and the left to right return scan of a resonant cycle. In the example shown in FIG. 4, a right to left movement portion of the beam trajectory is identified by the reference number 58. It should be understood that the term "beam trajectory" as used herein does not necessarily mean that the laser light is on or actually providing light. The term is used herein to illustrate the path that would be traced if the light remained on for a full cycle. As will be appreciated by those skilled in the art, the laser light is typically turned on and off continuously due to modulation and is also typically switched off at the two ends (left and right) of a scan or sweep. However, the modulation pattern can vary from full on for the complete scan or sweep to full off for the complete scan. Modulation of the scanning beam, and switching off at the end portion of a scan is also, of course, true for all types of laser printers including laser printers which use a rotating polygon mirror. Therefore, in the embodiment shown in FIG. 4, the laser beam is capable of providing modulated light at point 60 which is next to edge 62 of medium 44. However, as will be recognized, a printed page usually includes left and right margins. Therefore, although a printed image line could begin at point 60 on a right to left scan of the beam trajectory as shown by trajectory portion 58, the modulated light beam does not actually start to produce an image until point or margin 64 of the right to left portion of the trajectory and stops printing at the left margin 66. This is also indicated at the rightmost dot 68 on the printed image line 70. It will also be understood that the photosensitive medium 44 is moving in a direction as indicated by arrow 72. Therefore, to generate printed image line 70 between margins 64 and 66 as a horizontal line, the right to left beam trajectory is controlled by mirror assembly 12 pivoting on torsional hinges 22A and 22B about axis 24 an appropriate amount so that the resulting line between the beginning right end point or margin 64 and the left ending point or margin 68 is horizontal. That is, the beam trajectory is moved up during a beam sweep by substantially the same amount or distance as the photosensitive medium 44 moves up during the right to left beam sweep. After the right to left portion of the beam trajectory is complete at the left edge 74 of medium 44 (i.e., half of the resonant or oscillating cycle), the mirror is rapidly pivoted about torsional hinges 22A and 22B in the opposite direction as the resonant mirror changes the direction of its sweep as indicated by portion 76 of the beam trajectory. Then, when the left to right portion 78 of the trajectory beam sweep (resulting from pivoting about axis 28 on torsional hinges 26A and 26B) again reaches the left edge 74 of medium 44, the mirror is slowly pivoted about torsional hinges 22A and 22B to shift the left to right portion 78 of the beam trajectory upward as it traverses medium 44 in a manner similar to the right to left portion of the trajectory. Thus, the generated image line 80 starting at beginning point 82 and generated during the left to right scan is maintained parallel to the previous generated image line 70. Then as the beam trajectory passes the right edge 62 of the medium 44, the resonant scan mirror again begins to reverse its direction by pivoting in the opposite direction about torsional hinges 22A and 22B so as to return to the starting point or margin 64. The cycle is then of course repeated for another complete resonant sweep such that two more image lines can be produced.

It will be appreciated by those skilled in the art that although continuously controlling the up and down movement of the sweeping beam maintains two successive image lines parallel to each other is very important, if top quality printing is to be achieved, a laser printer also requires precision alignment of the optical components including the laser light source, the scanning mirror and any optical lenses. Although these components may be precisely aligned during manufacture of the printer, after a while regular operation of the printer may degrade such precise alignment due to mechanical shock or stress that might occur because of various factors including different coefficients of thermal expansion of the components, shifts in the angular output of the laser light due to temperature shifts and mode variations, and, of course, shock and vibrations experienced during transport and use.

Figure 5:
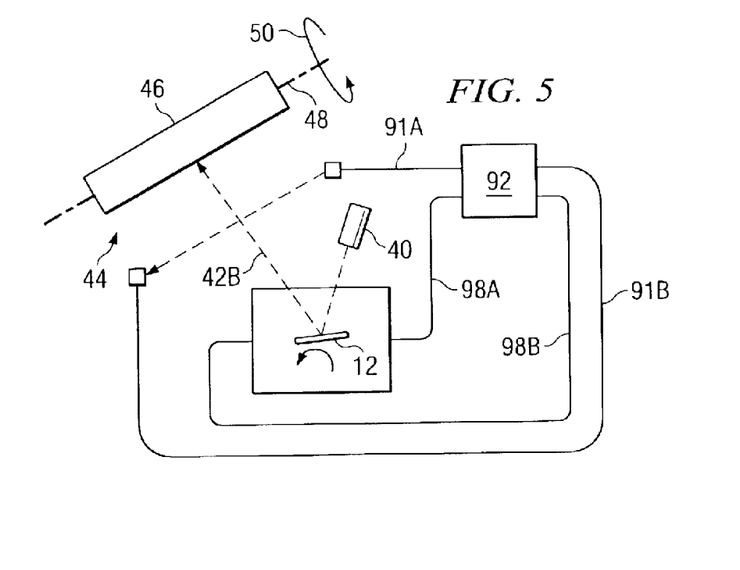
FIG. 5 is a block diagram of circuitry for sensors monitoring and dynamically aligning the beam sweep as illustrated in FIG. 5 with the moving photosensitive medium according to one embodiment of the present invention.
Figure 6:
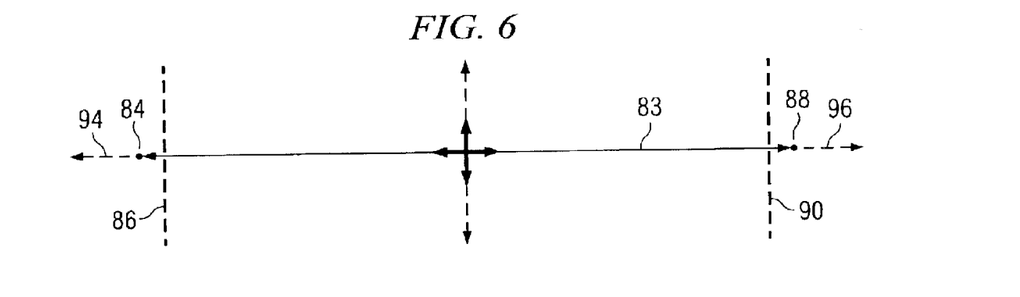
FIG. 6 illustrates a beam sweep with left and right overshoot.

The use of a torsional hinged mirror as described above with respect to FIG. 1 and FIG. 1A allows dynamic alignment to be achieved by providing an electronic control feedback loop. Referring now to FIGS. 5 and 6, there is shown respectively a block diagram schematic illustrating such a feedback arrangement and another view of a beam sweep 83 with overshoot. As shown in FIGS. 5 and 6, at least one light sensor is located to intercept the laser light beam sweep trajectory just before each end of a scan line such as indicated by sensor 84 which is located proximate to the left edge 86 and a second sensor 88 located proximate to the right edge 90. According to one embodiment, sensors 84 and 88 are positioned or located such that the scan or sweep produced by a resonant mirror passes each sensor as it is ending a sweep and just as it begins the sweep in the opposite direction, as shown in FIG. 6, such that two electrical pulses or signals are generated. The two electrical pulses or signals generated as the light beam passes the sensors are provided by connections 91A and 91B as feedback parameters to control circuitry 92 where the time between pulses is compared to determine the time difference between the left "overshoot" 94 and right "overshoot" 96 of the trajectory or beam sweep at each end of the two sweeps in a resonant cycle. The DC level of the two coils 30A and 30B of FIG. 2C which generate the resonant scans or sweeps is then adjusted as indicated by connections 98A and 98B until the "overshoot" or time between the end of a sweep and the start of the subsequent sweep in the opposite direction is the same from both sensors. When the overshoot is the same at both ends of a sweep, the beam is substantially aligned with the photosensitive medium.

Figure 7:
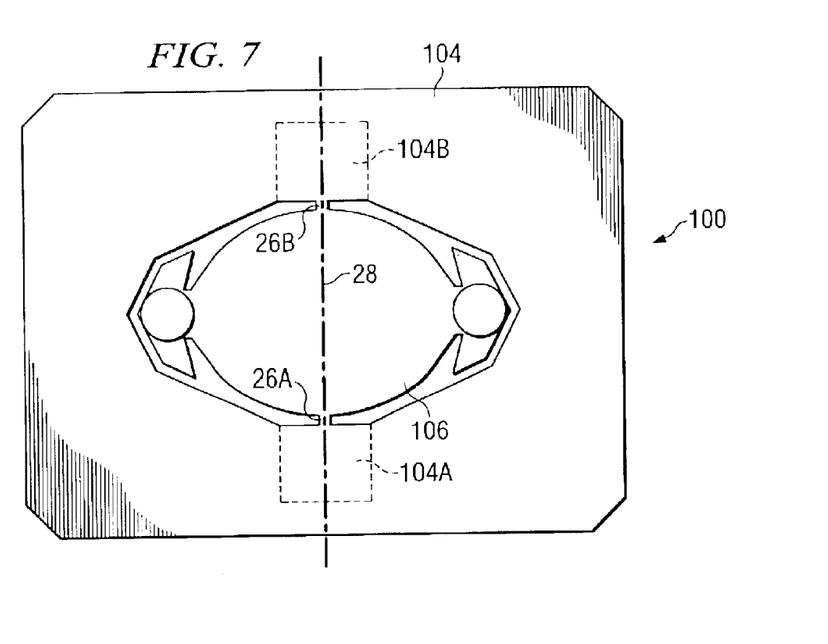
FIG. 7 is a single axis torsional hinge mirror.
Figure 8:
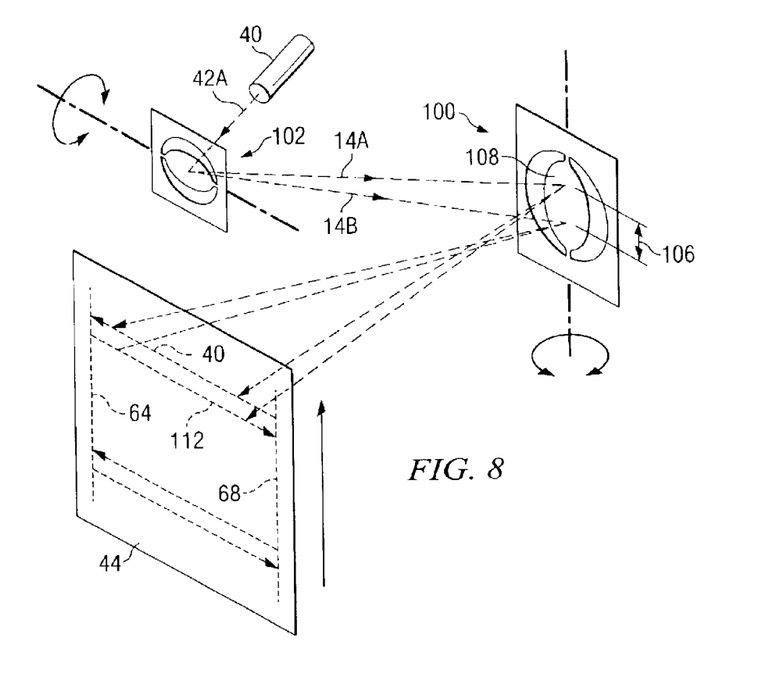
FIG. 8 illustrates the use of two single axis mirrors in a laser printer along with a block diagram of circuitry for dynamic alignment of the beam sweep according to another embodiment of the present invention.

Referring to FIG. 8, there is a perspective illustration of another embodiment of the present invention using two mirrors which pivot about a single axis, such as the single axis mirror 100 shown in FIG. 7, rather than one dual axis mirror. In addition, although FIG. 1 illustrates a two-axis mirror 12, two of the dual axis mirrors of FIG. 1 can be used to obtain the same results as achieved by using two single axis mirrors 100 of the type shown in FIG. 7. For example, two of the two-axis mirror arrangement shown in FIG. 1 may be used by not providing (or not activating) the drive mechanism for one of the axes. However, if two mirrors are to be used, it is believed to be advantageous to use a rugged single axis mirror 100 shown in FIG. 7. As shown, the single axis mirror 100 has only a single axis of rotation 28 and a single pair of hinges 26A and 26B.

Therefore, referring to FIG. 8, the single axis analog torsional hinged mirror 100A may be used in combination with a second similar single axis torsional mirror 102 to maintain printed lines of image at right angles to the page in the same manner as discussed above with respect to FIGS. 3A, 3B and 3C.

Referring again to FIG. 7, there is a support member 104 supporting a mirror or reflective surface 106 by the single pair of torsional hinges 26A and 26B. Thus, it will be appreciated that if the mirror portion 106 is made to resonant by a drive source, the mirror can be used to cause an oscillating light beam across a photosensitive medium in the same manner as discussed with regard to a dual axis mirror 12. It will also be appreciated that an alternate embodiment of a single axis mirror may not use the support member or frame 104 as shown in FIG. 7. Instead, also as shown in FIG. 7, the torsional hinges 26A and 26B may simply extend to a pair of hinge anchors 104A and 104B as shown in the dotted lines in FIG. 7.

Figure 7A:
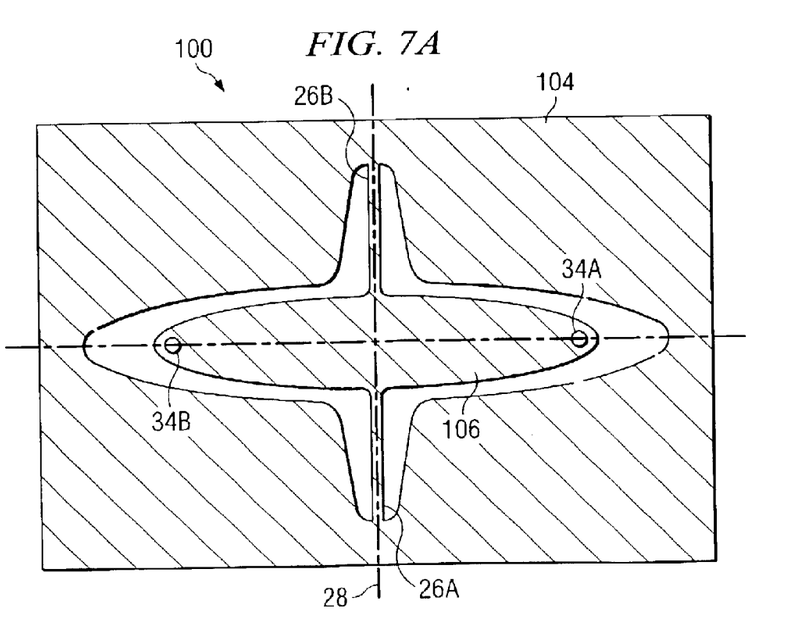
FIG. 7A is an alternate embodiment of a single axis torsional hinge mirror.

FIG. 7A illustrates another embodiment of a single axis mirror having a long oval shape similar to that of the dual axis mirror illustrated in FIG. 1A. Except for the long oval shape of the reflective surface 106, all of the functional parts of the mirror assembly are the same as discussed with respect to FIG. 1A and carry the same reference numbers.

Furthermore, alignment as discussed with respect to FIGS. 5 and 6 above is applicable to mirror 100 in the same manner as discussed above. However, as was discussed before, there also needs to be a method of moving the light beam in a direction orthogonal to the oscillation if parallel lines of print are to be achieved. Therefore, as discussed with respect to FIG. 8, a second single axis mirror 102 such as shown in FIG. 7 may be used to provide the vertical movement of the light beam.

The system of the embodiment of FIG. 8 uses the first single axis mirror 100 to provide the right to left, left to right oscillating and preferably resonant sweep as discussed with respect to FIGS. 3A, 3B and 3C. However, the up and down control of the beam trajectory is achieved by locating the second single axis mirror 102 to intercept the light beam 42A emitted from light source 40 and then reflecting the intercepted light to the mirror 100 which is providing the resonant oscillating sweep motion. Line 106 shown on mirror surface 108 of resonant mirror 100 illustrates how mirror 102 moves the light beam 42A up and down on surface 108 during the left to right and right to left beam sweep so as to provide parallel lines 110 and 112 on the moving medium 44.

Figure 9A:
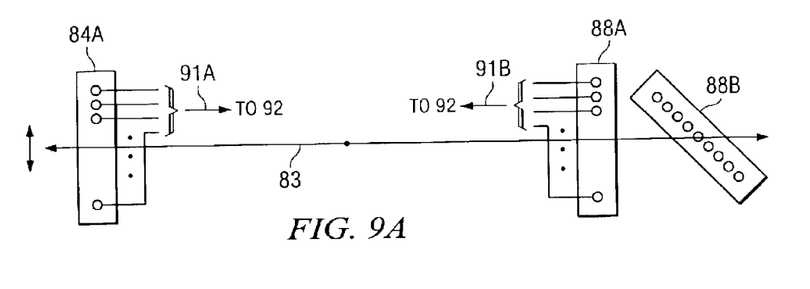
FIG. 9A illustrates a beam sweep intercepting a linear array of light sensor positioned close to the two ends of the beam sweep for aligning the beam orthogonally (vertically) to the beam sweep.

Alignment of the beam orthogonal to the oscillating or resonant beam sweep may also be accomplished in a manner similar to continuing the beam sweep discussed above with respect to FIGS. 5 and 6. For example, according to one embodiment, sensors 84 and 88 may be replaced with a linear array 84A and 88A as shown in FIG. 9A. The linear arrays 84A and 88A are oriented so that they have a vertical vector component (i.e., so there is an orthogonal component). Thus, the location at which the back and forth beam sweep 83 crosses the linear arrays 84A and 88A (i.e., which sensors receive light) can be continuously monitored. The output of the linear arrays are then provided on lines 91A and 91B to the computational circuitry 92 that then generates a bias signal to adjust the position of the beam in a direction orthogonal to the beam sweep and in the same manner as discussed above. Array 88B illustrates that the array does not have to be aligned at right angles to the beam sweep.

Figure 9B:
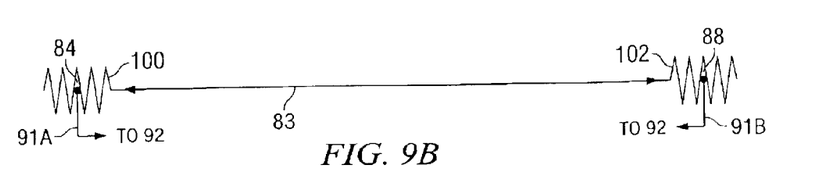
FIG. 9B illustrates the use of a pair of single sensors located proximate the end points of a beam sweep wherein the beam is orthogonally dithered as it passes the sensors for orthogonally aligning the beam sweep.

Alternately, single sensors 84 and 88, as discussed with respect to FIG. 6, may be used for monitoring and aligning the laser beam in a direction orthogonal with respect to selected beam sweeps. For example, a first group of beam sweeps may be used as discussed above with respect to FIG. 6 to move the beam either left or right to center the beam sweep. A second group of beam sweeps may then be used to adjust the beam in a direction orthogonal to the beam sweep. For example, as the beam sweep approaches the sensors 84 and 88 at its normal orthogonal location, it may be dithered away from its normal location in both directions orthogonal to the sweep as shown in FIG. 9B as indicated by position 100 and 102 of beam sweep 83. Then, in a manner already discussed with respect to FIG. 6, the amount of time the beam takes to dither orthogonally away from its normal sweep location in one direction until the beam again encounters the sensors can be monitored and then is compared in computational circuitry 92 to the amount of time the beam takes it to dither in the opposite direction. The different in these two time periods can be used to provide a bias signal to the orthogonal device to adjust the beam sweep location until the two elapsed times are the same.

It may also, of course, be possible to use a second set of sensors (not shown) instead of sensors 84 and 88 with the dithering to position the beams along the orthogonal axis.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

What is claimed is:

1. Apparatus for dynamically aligning a light beam sweep comprising:

a device having a reflective surface portion positioned to intercept a beam of light from a light source, said device attached for rotating around a first axis such that rotation of said device about said first axis results in a light beam reflected from said reflective surface sweeping along a plane;

a driver circuit for alternately causing pivoting of said device in one direction about said first axis and then in the opposite direction such that said reflected light beam sweeps across a moving target area, said moving target area having a first dimension and a second dimension orthogonal to said first dimension, said reflected light beam sweeping between a first limit and a second limit along said first dimension as said mirror device pivots about said first axis;

light sensors located one each proximate said first and second limits such that said reflected light beam encounters said first one of said light sensors before reaching the end of a sweep in a first direction and after beginning a return sweep in a second direction, and said reflected light beam encounters said second one of said light sensors before reaching the end of said return sweep in said second direction and after beginning another sweep in said first direction; and computation circuitry for receiving signals from said first and second sensors indicative of light encountering said sensors and for providing signals to said driver circuit to control the speed and positioning of said reflected light beam.

2. The apparatus of claim 1 wherein said device having said reflected surface is a oscillating scanning mirror.

3. The apparatus of claim 2 wherein said driver circuit generates resonant oscillation of said reflective surface about said first axis.

4. The apparatus of claim 1 wherein said moving target area is cylindrical shaped and rotates about an axis through the center of said cylindrical shape.

5. The apparatus of claim 1 further comprising another device for rotating about another axis such that light from said reflective surface moves in a direction substantially orthogonal to said plane and another device for pivoting said mirror device about another pair of torsional hinges such that a trace across said moving target extends substantially orthogonal to the movement of said target area.

6. The apparatus of claim 5 wherein said first device comprises a mirror pivotally supported by a first pair of torsional hinges.

7. The apparatus of claim 6 wherein said second device is a gimbal support pivotally attached to a support member by a second pair of torsional hinges and wherein said mirror of said first device is attached to said gimbal support by said first pair of torsional hinges.

8. The apparatus of claim 5 wherein said first device comprises a first single axis torsional hinged mirror and said second device comprises a second single axis torsional hinged mirror, said second device positioned to intercept said beam of light from said light source and reflect said light beam to said reflective surface of said first device.

9. The apparatus of claim 5 wherein each of said sensors is a linear array of a multiplicity of sensors oriented with a vector component orthogonal to the beam sweep and connected to said computational circuitry, and wherein said computational circuitry determines the location of sensors of said multiplicity at which said beam sweep crosses said array and said computational circuitry provides a control signal to said another device for orthogonally adjusting the position of said beam sweep.

10. The apparatus of claim 5 and further comprising circuitry for orthogonally dithering said beam sweep away from its normal orthogonal position during selected sweeps as said selected beam sweeps move past said sensors and wherein said computational circuitry determines the elapsed time for said dithered beam to complete travel in a first direction from said normal orthogonal position to an extreme dithered position and back to said normal orthogonal position and then determine the elapsed time for the beam to dither in the opposite direction, said computational circuitry then provides a control signal to said another device to orthogonally adjust the position of said beam sweep.

11. A printer including apparatus for dynamically aligning a laser beam sweep comprising:
- a light source providing a beam of light;
- a first device comprising a reflective surface portion positioned to intercept said beam of light from said light source, said reflective surface supported by a first hinge arrangement for pivoting about a first axis and supported by a second hinge arrangement for pivoting about a second axis substantially orthogonal to said first axis such that pivoting of said device about said first axis results in light reflected from said reflective surface sweeping along a first plane, and pivoting of said device about said second axis results in said reflective light moving in a direction substantially orthogonal to said first plane;
- a first driver for causing pivoting in one direction about said first axis and then the opposite direction;
- a moving photosensitive medium having a first dimension and a second dimension orthogonal to said first dimension, and located to receive an image of said reflected light beam as it sweeps across said medium between a first limit and a second limit along said first dimension as said mirror device pivots about said first axis, said photosensitive medium moving in a direction along said second dimension such that an image of a subsequent light beam sweeping across said medium is spaced from a previous image;
- a second driver for pivoting about said second axis such that images of said sweeping light beam are received on said moving photosensitive medium along a line substantially orthogonal to the movement of said photosensitive medium;
- light sensors located one each proximate said first and second limits such that said reflected light beam encounters said first one of said light sensors before reaching the end of a sweep in a first direction and after beginning a return sweep in a second direction, and said reflected light beam encounters said second one of said light sensors before reaching the end of said return sweep in said second direction and after beginning another sweep in said first direction; and
- computation circuitry for receiving signals from said first and second sensors indicative of light encountering said sensors and for providing signals to said second drive coil to control the speed and positioning of said reflected light beam.

12. The printer of claim 11 wherein said reflective surface is a resonant scanning mirror.

13. The printer of claim 12 wherein said first and second hinge arrangements comprise a first pair of torsional hinges and a second pair of torsional hinges.

14. The printer of claim 13 further comprising a gimbal portion and a support member wherein said reflective surface is pivotally attached to said gimbal portion by said first pair of torsional hinges, and said gimbal portion is pivotally attached to said support member by said second pair of torsional hinges.

15. The printer of claim 11 wherein said first and second hinge arrangements comprise a first pair of torsional hinges and a second pair of torsional hinges and further comprising a gimbal portion and a support member, said reflective surface pivotally attached to said gimbal portion by said first pair of torsional hinges and said gimbal portion pivotally attached to said support member by said second pair of torsional hinges.

16. The printer of claim 15 wherein each of said light sensor is a linear array of a multiplicity of sensors oriented with a vector component orthogonal to the beam sweep and connected to said computational circuitry, and wherein said computational circuitry determines the location of sensors of said multiplicity at which said beam sweep crosses said array and said computational circuitry provides a control signal to said second driver for orthogonally adjusting the position of said beam sweep.

17. The printer of claim 15 wherein each of said light sensor is a linear array of a multiplicity of sensors oriented with a vector component orthogonal to the beam sweep and connected to said computational circuitry, and wherein said computational circuitry determines the location of sensors of said multiplicity at which said beam sweep crosses said array and said computational circuitry provides a control signal to said another device for orthogonally adjusting the position of said beam sweep.

18. The printer of claim 11 wherein said photosensitive medium is cylindrical shaped and rotates about an axis through the center of said cylinder.

19. The printer of claim 11 wherein said light beam traces on said medium move between said first and second limit in both directions such that said printer is a bi-directional printer.

20. The printer of claim 11 wherein said light beam traces on said medium move between said first and second limit in both directions such that said printer is a bi-directional printer.

21. A printer having apparatus for dynamically aligning a laser beam sweep comprising:
- a light source providing a beam of light;
- a mirror device comprising a reflective surface portion positioned to intercept said beam of light from said light source, said reflective surface pivotally attached to a gimbal portion by a pair of torsional hinges, and said gimbal portion pivotally attached to a support member by another pair of torsional hinges, such that pivoting of said device about said pair of torsional hinges results in light reflected from said reflective surface sweeping along a first plane and pivoting of said device about said another pair of torsional hinges results in said reflective light moving in a direction substantially orthogonal to said first plane;

a first driver for causing pivoting in one direction about a first one of said pair and another pair of said torsional hinges and then the opposite direction;

a moving photosensitive medium having a first dimension and a second dimension orthogonal to said first dimension, and located to receive an image of said reflected light beam as it sweeps across said medium between a first limit and a second limit along said first dimension as said mirror device pivots about said first one of said pair and another pair of said torsional hinges, said photosensitive medium moving in a direction along said second dimension such that an image of a subsequent light beam sweeping across said medium is spaced from a previous image;

a second driver for pivoting said mirror device about a second one of said pair and another pair of torsional hinges such that images of said sweeping light beam are received on said moving photosensitive medium along a line substantially orthogonal to the movement of said photosensitive medium;

light sensors located one each proximate said first and second limits such that said reflected light beam encounters said first one of said light sensors before reaching the end of a sweep in a first direction and after beginning a return sweep in a second direction, and said reflected light beam encounters said second one of said light sensors before reaching the end of said return sweep in said second direction and after beginning another sweep in said first direction; and computation circuitry for receiving signals from said first and second sensors indicative of light encountering said sensors and for providing signals to said second drive coil to control the speed and positioning of said reflected light beam.

22. The printer of claim 21 wherein said moving photosensitive medium has cylindrical shape and rotates about an axis through the center of said cylinder.

23. The printer of claim 21 wherein said light beam traces on said medium move between said first and second limit in both directions such that said printer is a bi-directional printer.

24. The printer of claim 21 wherein each of said light sensor is a linear array of a multiplicity of sensors oriented with a vector component orthogonal to the beam sweep and connected to said computational circuitry, and wherein said computational circuitry determines the location of sensors of said multiplicity at which said beam sweep crosses said array and said computational circuitry provides a control signal to said second driver for orthogonally adjusting the position of said beam sweep.

* * * * *